United States Patent [19]
Bridges et al.

[11] Patent Number: 5,537,461
[45] Date of Patent: Jul. 16, 1996

[54] INFORMATION SERVICES PLATFORM

[75] Inventors: Michael L. Bridges, Richmond, Va.; James A. Craig, Little Silver, N.J.; Lewis D. Dodrill, Richmond, Va.; John D. Fink, Midlothian, Va.; William E. Jones, Richmond, Va.

[73] Assignee: AT&T Corp., Murray Hill, N.J.

[21] Appl. No.: 420,456

[22] Filed: Apr. 10, 1995

Related U.S. Application Data

[63] Continuation of Ser. No. 50,931, Apr. 21, 1993, abandoned.

[51] Int. Cl.⁶ .................................................. H04M 1/64
[52] U.S. Cl. .................... 379/88; 379/67; 379/93; 379/96; 379/207
[58] Field of Search .................... 374/67, 88, 89, 374/93, 94, 96, 97, 201, 204, 207, 219, 243, 244, 245; 379/246

[56] References Cited

U.S. PATENT DOCUMENTS

| | | | |
|---|---|---|---|
| 4,649,563 | 3/1987 | Riskin | 379/97 |
| 4,827,500 | 5/1989 | Binkerd et al. | 379/88 |
| 4,897,867 | 1/1990 | Foster et al. | 379/94 |
| 5,052,038 | 9/1991 | Shepard | 379/213 |
| 5,136,634 | 8/1992 | Rae et al. | 379/94 |
| 5,181,238 | 1/1993 | Medamana et al. | 379/95 |
| 5,187,710 | 2/1993 | Chau et al. | 370/110.1 |
| 5,193,110 | 3/1993 | Jones et al. | 379/94 |
| 5,199,062 | 3/1993 | Von Meister et al. | 379/207 |
| 5,317,627 | 5/1994 | Richardson, Jr. et al. | 379/94 |
| 5,345,501 | 9/1994 | Shelton | 379/89 |
| 5,384,829 | 1/1995 | Heileman, Jr. et al. | 379/67 |
| 5,384,831 | 1/1995 | Croswell et al. | 379/67 |

FOREIGN PATENT DOCUMENTS

| | | | |
|---|---|---|---|
| 491497 | 12/1991 | European Pat. Off. | H04Q 3/00 |
| 531048 | 8/1992 | European Pat. Off. | H04M 3/42 |
| 2211698 | 7/1989 | United Kingdom . | |
| WO8805985 | 7/1987 | WIPO | H04Q 3/42 |

OTHER PUBLICATIONS

AT&T Technical Journal, vol. 69, No. 5, Sep. 1990, "Interactive Voice Technology Applications", Fischell et al, pp. 69,74.

AT&T Technical Journal, vol. 70, No. 3/4, 1991, "The AT&T Service Circuit Node: a new element . . . ", Hall et al, pp. 75,77.

International Switching Symposium 1990, vol. 1, 28 May 1990, "A Conceptual study of a Voice Conversation Facility . . . ", Yoshida et al, pp. 129,132.

Proceeding of National Comms. Forum, "Network Service Architecture Evolution", pp. 1747–1751, Lemay et al, vol. 42, No. 2, Sep. 30, 1988.

Primary Examiner—Jeffery Hofsass
Assistant Examiner—Scott L. Weaver
Attorney, Agent, or Firm—Frederick B. Luludis

[57] ABSTRACT

A facility is provided in a telecommunications network which transforms a particular type of telephone call connection, e.g., a connection carrying a call placed to a source of information at the point that it enters the network into a digital network connection extending to the back end of a services platform and interfacing with the called destination. Advantageously, then, a voice connection that is typically established via the telecommunications network to an information source is replaced by an inexpensive digital connection and an information services unit.

18 Claims, 6 Drawing Sheets

INFORMATION SERVICES PLATFORM

This application is a continuation of application Ser. No. 08/050,931, filed on Apr. 21, 1993, now abandoned.

FIELD OF THE INVENTION

The invention relates to a telephone call placed to a source of particular information.

BACKGROUND OF THE INVENTION

Many businesses use voice interactive systems to automatically respond to customer inquiries. For example, a customer may place a call to establish a connection via a public switched telephone network to a business. Once the connection is established, then the caller may interact with a voice interactive system to access desired information relating to, for example, an account that the customer has with the business. It is often the case that such a call is placed using a toll free telephone number associated with the business, i.e., an 800 service telephone number. What this means is that the business pays for the cost of the call, rather than the calling customer. The cost of the call is the price that the network charges for establishing a connection between the calling customer and business destination, and is usually a fixed price. Nevertheless, the accumulated charges for calls placed to the business' 800 service number over a period of time could be very high.

SUMMARY OF THE INVENTION

We have recognized that the cost of such calls could be reduced greatly by, in accord with an aspect of the invention, connecting such a call to an information services platform associated with the point at which the call enters a telephone network so that an inquiry entered by the calling party may be received by a front end of the platform which then passes the inquiry via a digital network to a back end of the platform for presentation to a called source of information. Advantageously, then, the voice connection that is typically established via a telephone network to an information source is replaced by an inexpensive digital network connection.

Specifically, the front end of the inventive service platform accepts input from a caller and identifies a respective information source, e.g., a banking service, as a function of that input. The front-end then emulates an interface, e.g., a voice menu, that the information source would present to the caller. When the caller responds to the voice menu, the front end forms the response into a message and transmits the message to the back end of the platform service via the digital network. The back end then interfaces with the identified source to obtain the desired information for transmission to the front-end via the digital network. For example, if the response is a request for particular information, e.g., the balance in the caller's savings account, then the back end obtains that information from the source and returns it to the front-end via the digital network. The front end, in turn, converts the information into a desired format, e.g, voice, data or facsimile, and transmits the result over the telephone connection extending to the caller.

DETAILED DESCRIPTION

Figure 1:
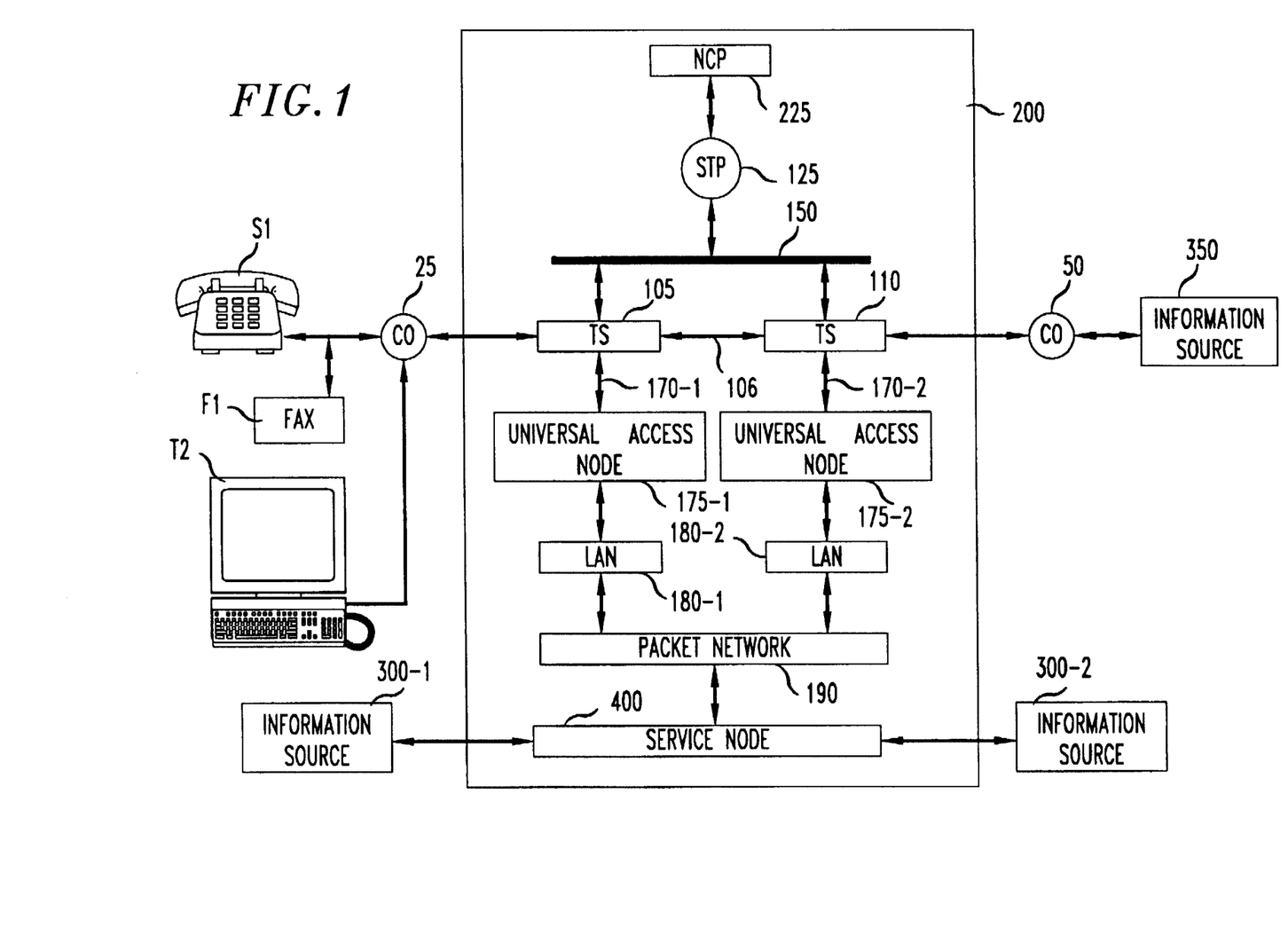
FIG. 1 is a block diagram of a telecommunications system in which the principles of the invention may be practiced.

Turning now to FIG. 1, there is shown telecommunications network 200, which may be, for example, the AT&T public switched network, that provides a number of different calling services for its subscribers, e.g., the subscriber associated with station S1.

Network 200 includes, inter alia, a plurality of interconnected Toll Switching (TS) offices, two of which are shown in the FIG., namely TS 105 and 110. Such toll switches may be any one of a number of different well-known types of switching equipments, such as, for example, the No. 4ESS™ (Electronic Switching System) commercially available from AT&T. Such toll switches are also interconnected via data link 150, which may be, for example, the well-known Common Channel Signaling network (CCS). The toll switches exchange data messages with one another via CCS network 150 in order, for example, to establish a telephone connection from an originating toll switch, e.g., TS 105, to a destination toll switch, e.g., TS 110.

Each toll switch, e.g., TS 105, is also connected to one of a plurality of Central Offices (CO), such as CO 25. A CO is arranged to connect a calling telephone station (e.g., S1) which has dialed a particular telephone number outside of the calling area served by the CO to an associated toll switch, e.g., TS 105. A CO is also arranged to connect calls that it receives from an associated toll switch (destination switch) to a called station, e.g., station S1.

Network 200 further includes a number of centralized databases, commonly referred to as Network Control Points (NCPs) and which support the provision of various network 200 services, such as the well-known 800 calling service. Such NCPs, for example, NCP 225, are positioned at various locations within network 200 and are interconnected with the toll switches via CCS network 150 and various signal transfer points, such as Signal Transfer Point (STP) 125.

One function of an NCP is to translate an 800 service telephone number that it receives from an originating toll switch, e.g., TS 105, into a telephone number specified by the business customer associated with the 800 service telephone number. The NCP then returns, inter alia, the translated telephone number to the originating toll switch. The latter toll switch, in turn, forwards the call via intertoll path 106 to a destination toll switch, e.g., TS 110 identified as a function of the translated telephone number. The destination toll switch, in turn, forwards the call to the called destination identified by the translated telephone number.

If the called destination is an information source, e.g., information source 350 connected to network 200 via CO 50, then the caller may interact with source 350 to obtain desired information via the call connection, in which the source may present the information to the caller in a verbal format. One aspect of 800 services is that the cost of the call connection is charged to the called station, e.g., source 350, rather than to the calling station. As mentioned above, the accumulated costs (charges) for such calls over a period of time, e.g., one month, could be very high.

We have recognized that the cost of such a call may be reduced greatly by, in accordance with an aspect of the invention, transforming a voice connection at the point where it enters network 200, i.e., at an originating toll switch, into a data connection extending via the inventive information services platform to the desired source of information.

Specifically, assume that the aforementioned 800 service telephone number is associated with information source 300-1, which interacts with a caller via the inventive information services platform. In an illustrative embodiment of the invention, the services platform includes a plurality of front-end Universal Access Nodes (UAN), e.g., UAN 175-1, associated with respective ones of the toll switches, e.g., TS 105. It also includes a digital network 190 and a plurality of back-end service nodes, one of which is shown in the FIG., namely service node 400. A front-end UAN, e.g., UAN 175-1, presents an interface to its associated toll switch for the purpose of receiving a call therefrom and for interacting with a caller on behalf of a respective-information source, e.g., source 300-1, that the caller desires to access. Back-end service node 400, on the other hand, presents an interface to source 300-1 for the purpose of obtaining therefrom information requested by the caller and for supplying the information via packet network 190 to front-end UAN 175-1 for presentation to the caller via communications path 170-1 and the associated toll switch, e.g., TS 105.

More particularly, and assuming that TS 105 is the aforementioned originating toll switch, then TS 105, upon receiving the aforementioned translated telephone number from NCP 225, generates a routing number identifying front-end UAN 175-1 as the destination switch. (Hereinafter, a front-end UAN will be referred to as just "UAN".) TS 105 thus sends the call, as well as the associated calling information, to UAN 175-1 via communications path 170-1. Such calling information includes what is referred to as a Dialed Number Identification Service (DNIS) derived from the dialed telephone number, which identifies the type and/or origin of the associated call. UAN 175-1, responsive to receipt of the call, identifies as a function of the received DNIS the requested service and, thus, the identity of the called information source, e.g., source 300-1. In addition, UAN 175-1 presents to the caller via an associated access module connected to the call the application interface that the called information source 300-1 would normally present to a caller connected directly thereto. In accord with an aspect of the invention, such an application interface is defined by particular application script that causes a simple software process (discussed below) to emulate such an interface. That is, the access module (discussed below) converts script instructions into a form expected by the caller. For example, if the call is a voice call, then the access module converts the instructions into an analog form and transmits the result over the voice connection extending to the caller via path 170-1 and TS 105.

Typically, the front end of the aforementioned script may be a greeting identifying the information source and the remainder of the script may present a menu identifying the different types of information that is supplied by source 300-1, with each such type of information associated with a respective digit, as is done in conventional voice interactive arrangements. That is, the script announces a particular type of information and the associated digit. If the caller desires that information then the caller may enter the associated digit by pressing the telephone key pad button corresponding with that digit. The caller's telephone station set, e.g., station set S1, responsive thereto, transmits a dual-tone multifrequency (DTMF) signal characterizing the digit. (In an illustrative embodiment of the invention, it is also possible that the caller may interface with a UAN 170 by voice or by data, in which the data is entered via a data terminal, e.g., terminal T2.) Upon receipt of the latter signal via TS 105 and path 170-1, the access module connected to the call converts the received signal into a digital version thereof and passes the result to a CPU (discussed below) contained in UAN 175-1. The process running on the CPU, in turn, translates the digit into a request identifying the information requested by the caller. The process then forms a message containing, inter alia, the request, identity of the information source, and a conventional header identifying the sender and receiver of the message, namely UAN 175-1 and service node 400, respectively. The process then sends the message via its associated CPU to an associated Local Area Network (LAN) 180-1 for transmission over digital network 190, which may be, for example, a fast packet network, such as an X.25, cell or frame-relay packet network. Accordingly, reference to transmitting a message over network 190 also includes data packets. In an illustrative embodiment of the invention, LAN 180-1 may be the Datakit® virtual circuit switch commercially available from AT&T, in which a LAN 180 is used to interface the associated UAN 175 with network 190. (As such, each LAN 180 may be eliminated by deploying the interface in the associated UAN 175.)

Upon receipt of the data packet, back-end service node 400 unbundles the data message (or packet) to identify the information source, i.e., source 300-1, and the particular request. Armed with that information, back-end service node 400 then interfaces with source 300-1 via communications path 401 to obtain the requested information. When it obtains that information, then node 400 forms a message containing, inter alia, the requested information, identity of the source and a header identifying the sender and receiver of the data packet. Node 400 then sends the message to UAN 175-1 via an associated LAN (discussed below) and packet network 190.

Upon receipt of the message via network 190 and LAN 180-1, the CPU process contained in UAN 175-1 removes the requested information from the received message and causes the aforementioned access module to transmit the information in a form, e.g., voice, expected by the caller. More particularly, as an aspect of the invention, the caller may receive the requested information in one of a number of different formats including voice, data or facsimile. Thus, the application script that is presented to the caller may be arranged to give the caller the option of receiving the requested information in a particular format. For example, if the caller selects the facsimile option, then upon receipt of the requested information the application script instructs the caller via the access module to connect a facsimile machine, e.g., facsimile machine F1, to the telephone connection. The UAN 175-1 application process then causes the access module to transmit the requested information in the form of a facsimile via path 170-1 and TS 105. Alternatively, a caller may communicate with a UAN, e.g., UAN 175-1, via a data terminal, such as terminal T2. As such, UAN 175-1 transmits prompts which are displayed on the terminal T2 display. The caller, in turn, responds to such prompting in a conventional manner, i.e., by operating the appropriate input keys of the terminal T2 keyboard.

Figure 2:
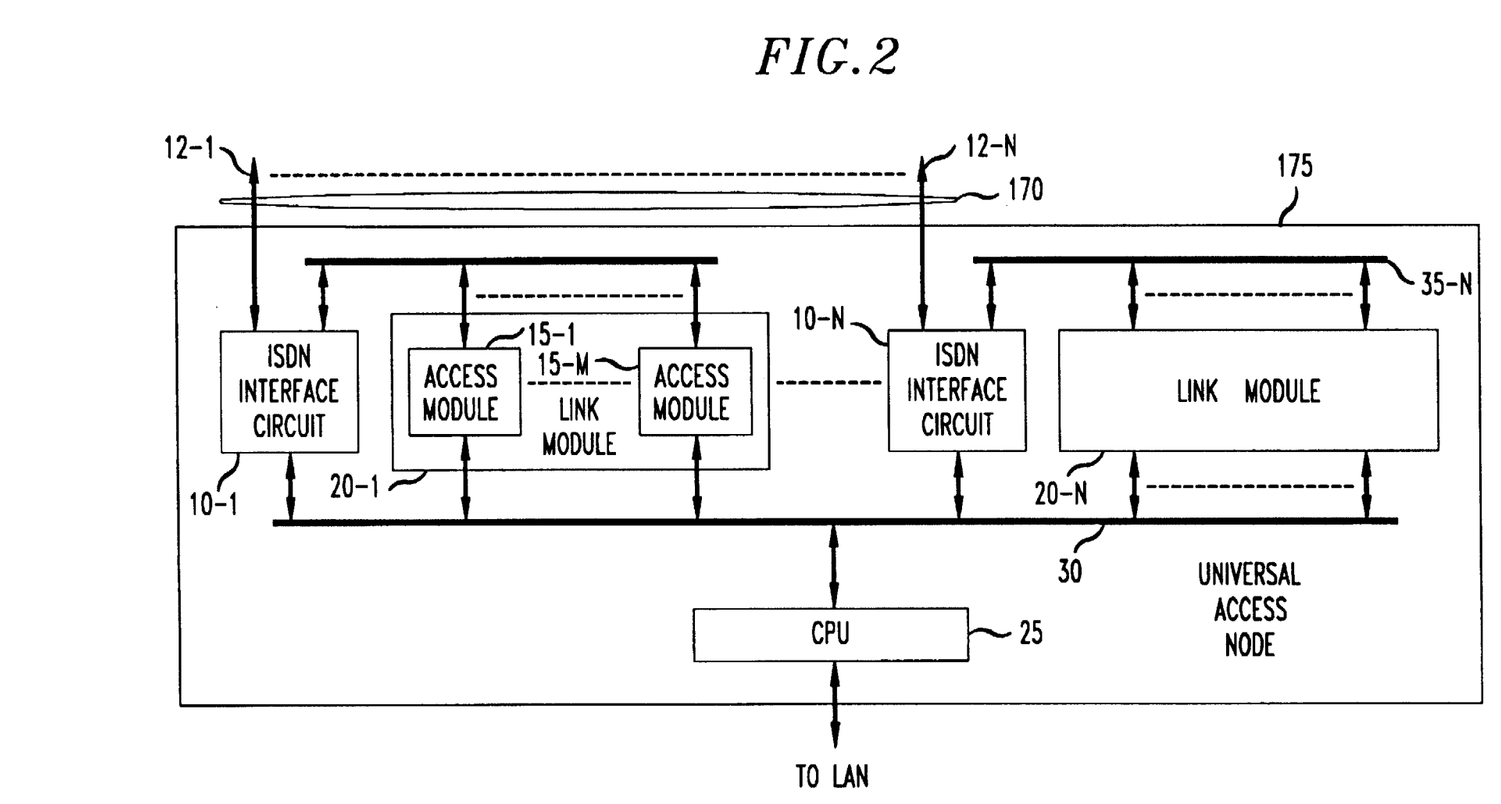
FIG. 2 is a block diagram of the universal access node of FIG. 1.

Turning now to FIG. 2, a UAN 175, e.g., UAN 175-1 (FIG. 1) includes a Central Processing Unit (CPU) 35, which may be, for example, the RackPro 486 processor commercially available from Diversified Technology, Ridgefield, Miss., U.S.A. CPU 35, which operates under the control of the well-known Unix operating system, communicates with the various elements forming the associated UAN 175 over a conventional AT bus 30. Such elements include a plurality of conventional ISDN (Integrated Services Digital Network) interface circuits 10-1 through 10-N and a plurality of link modules 20-1 through 20-N, where N may be, for example, four. Each such ISDN interface circuit, e.g., circuit 10-1, which may be, for example, the EA-24 interface circuit commercially available from the Dynatel Corporation, Santa Clara, Calif., presents an interface to a Primary rate ISDN communication path, e.g., 12-1, comprising 23 B channels and one D channel. Each such B channel is used to establish a call connection between a toll switch and the associated UAN 175 and the D channel is used to transport signaling information associated with a call connection carried by the respective one of the B channels.

Each link module 20, is formed from three communications circuit boards, for example, the FC-3000 communications circuit boards commercially available from the Linkon Corp. of New York, N.Y. Such boards form a plurality of DSP (Digital Signal Processor) based access modules 15-1 through 15-M (where M≧1), in which a DSP is used to serve a PRI rate B channel (voice channel). As a result of such DSP processing power, a link module allows standard voice signal processing, DTMF and MF decoding, facsimile, and text-to-speech processing to occur simultaneously on different B channels that the link module is serving.

A UAN 175 also includes a conventional Peripheral Extension Bus (PEB) 35 which, in essence, operates to perform a time slot interchange function between an access module 15 and its associated ISDN interface circuit 10 serving a respective B channel that is communicating with the module. Briefly, an access module 15 exchanges call information (i.e., voice signals, MF signals, etc.) with a B channel over respective assigned time slots of the associated PEB 35. That is, when an access module 15 transmits information over its assigned time slot to its associated B channel, then PEB 35 transfers the information to a time slot assigned to the interface circuit serving that B channel, and vice-versa. The interface circuit, in turn, removes the information from PEB bus 35 during that time and transmits the information to the associated toll switch, e.g., TS 105, via the associated ISDN B channel.

TS 105 (FIG. 1) notifies UAN 175-1 of a call that is being forwarded thereto via an idle B channel serving the particular call type (called information source) by transmitting signaling information relating to the call over the associated D signaling channel, as mentioned above. Such signaling information includes the aforementioned DNIS. The ISDN interface circuit serving that path, in turn, removes the signaling information from the associated D channel and supplies it to processor 25 via AT bus 30. Processor 25, responsive to receipt of the information, assigns an idle access module 15, e.g., module 15-1, to that B channel. Processor 25 then assigns idle time slots of the associated PEB 35-1 to the B channel and selected access module 15-1, respectively. Processor 25 also identifies as a function of the received DNIS an application process that will service the call. The identified application process, in turn, communicates with the caller via bus 30, access module 15-1, B channel and PEB 35-1 to ascertain the type of information that the caller desires to obtain from the called information source by, in accord with an aspect of the invention, emulating the interface that the called information source presents to a caller. The identified application process then proceeds in the manner described above to obtain the requested information and deliver it to the caller.

Figure 3:
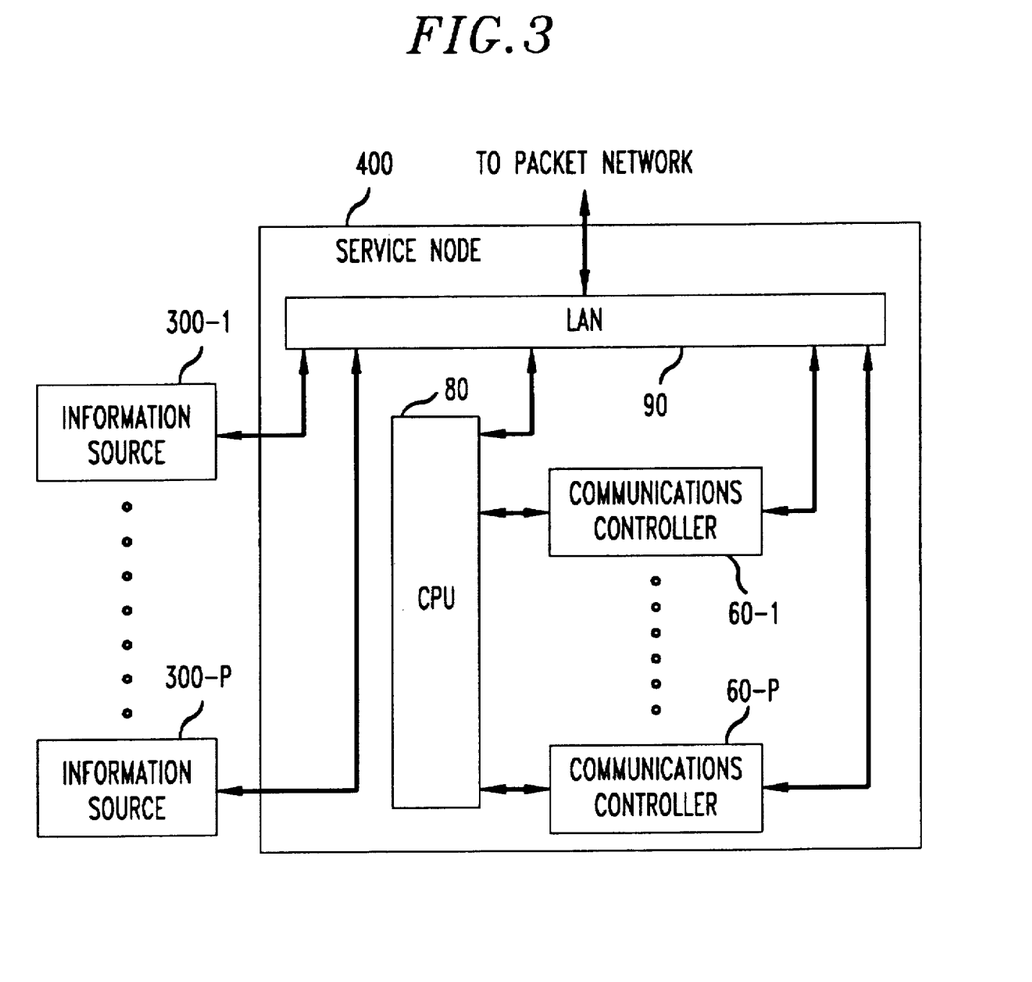
FIG. 3 is a block diagram of the service node of FIG. 1.

Turning now to FIG. 3, it is seen that a back-end service node, e.g., service node 400, includes CPU 80, which may be similar to CPU 25 serving ASN 175 (FIG. 2). It also includes a plurality of communications controllers 60-1 through 60-P and local area network 90 for interfacing CPU 80 with packet network 190 and for interfacing the communications controllers 60 with respective information sources 300-1 through 300-P. In an illustrative embodiment of the invention, LAN 90 may also be a Datakit virtual circuit switch and each of the communications controllers 60 may be, for example, the multi-port network adapter/PC 2MB controller commercially available from Eicon Technology, Montreal, Canada, which supports a number of different communications protocols, such as the IBM SNA and SDLC protocols. What this means is that a communications controller 60 may communicate with an information source 300, which, in a typical case, may be a 3270 IBM mainframe computer, as though the controller 60 were a particular type of input device, such as a display terminal connected to the mainframe.

More particularly, when a UAN 175 message bearing a request for information is received via network 190 and LAN 90, it is presented to CPU 80. CPU 80, in turn, processes the message to determine which source 300 contains the requested information and then presents the request to the associated communications controller, e.g., controller 60-1. Controller 60-1 repackages the request using the protocol expected by the identified information source, e.g, source 300-1, and sends the repackaged message to that source via LAN 90. If, as mentioned above, source 300-1 is a 3270 mainframe computer, then the repackaged request represents an entry from a display terminal. In that instance, source 300-1 obtains the requested information, forms it into a response to a terminal entry that is to be displayed on the terminal as a screen and sends the response to the originator of the request, namely controller 60-1, via LAN 90. Controller 60-1, in turn, stores the screen in its internal memory, locates the screen field containing the requested information and then presents that information to CPU 80 for delivery to the requesting UAN 175. CPU 80, in turn, packages the information received from controller 60-1 into a data message (or packet) containing the address of the requesting UAN and transmits the data message thereto via LAN 90 and packet network 190. The receiving UAN, in turn, presents the information to the caller in the manner discussed above.

Figure 4:
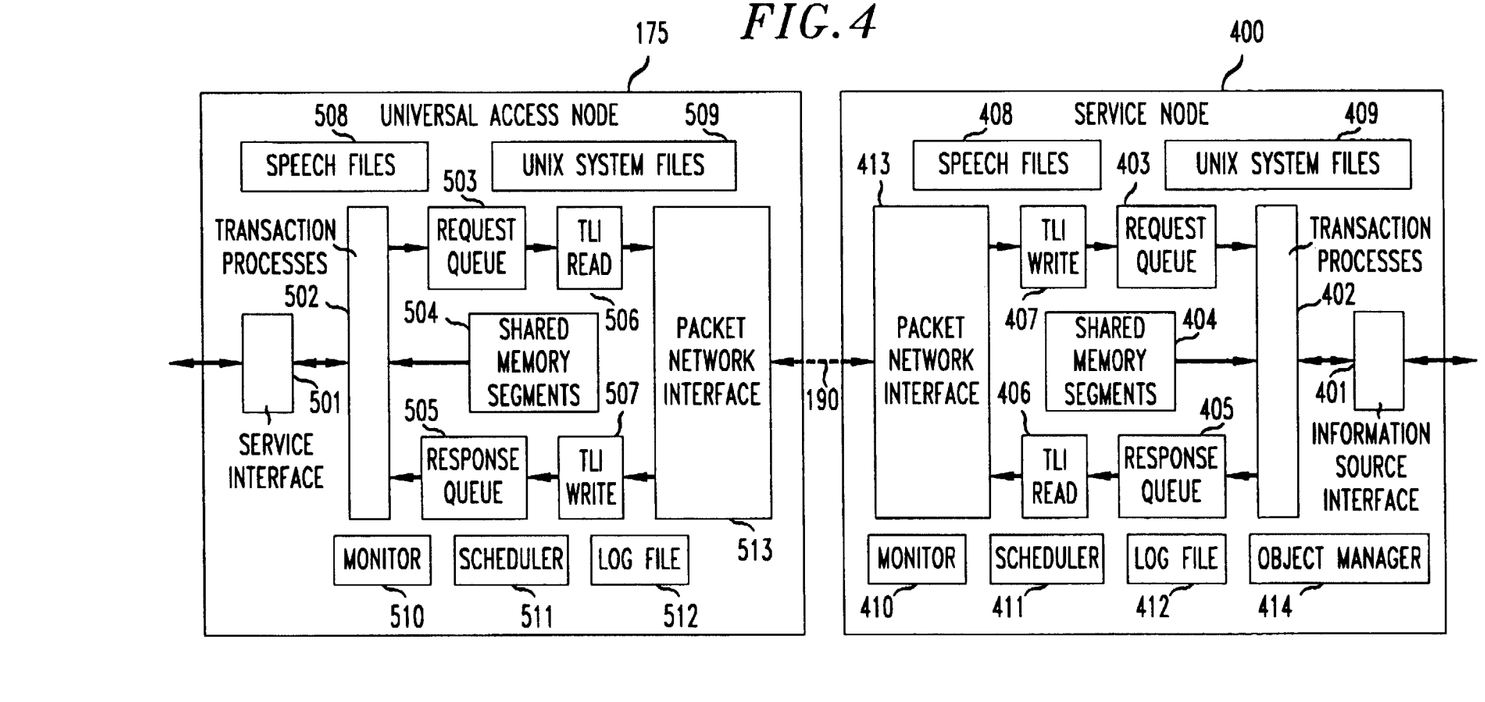
FIG. 4 is a logical layout of the software programs which respectively control the operation of a universal access node and service node and which implement the principles of the invention therein.

A logical layout of the software which implements the invention in an UAN, e.g., UAN 175-1, and service node 400, is illustrated in FIG. 4. It is seen from the FIG. that a number of software functions that are performed in an UAN are also performed in the service node. As such, a discussion of one such function in the UAN, e.g., UAN 175-1, equally pertains to the corresponding function in the service node, e.g., service node 400.

In particular, the software interface 501 which interfaces a UAN with a toll switch, is provided by the ISDN circuit board and Linkon FC-3000 communications board. Similarly, the software that drives packet network interface 513 (413) is provided by the LAN which is used to interface the UAN (service node 400) with packet network 190. In addition, the information source interface software 401 is provided by the Eicon multi-port network adapter/PC 2MB controller. The remaining software 502 through 513 (402 through 412 and 414) drives CPU 25 (80).

As will be discussed below in detail, the processes that form transaction process 502 are driven by respective sets of instructions (script) stored in memory 504. It suffices to say at this point, however, that a set of such instructions causes a transaction, or application process to (a) emulate the interface that a particular information source presents to a user, (b) process information entered by a caller for presentation to the called information source and (c) present a response received from the information source to the caller. The processes forming transaction process 402 operate in a similar manner with respect to their associated informations sources, but in accord with their respective sets of instructions stored in memory 404.

A transaction process 502 sends a user request to a particular information source by storing the request with a respective queue identifier in an associated message queue 503. Transport Layer Interface (TLI) read process 506 (a) unloads the request from queue 503, (b) forms the request into a packet message containing the addresses of the originator and receiver (service node) of the packet and (c) presents the packet to packet network interface 513 for delivery via network 190. TLI read 406 performs a similar function with respect to a response received from an information source, in which the response is associated with a queue identifier so that the response may be delivered to the proper response queue 505. That is, upon receipt of a response it is presented to TLI write 507, which stores the received response in a memory queue identified by the aforementioned identifier and contained in queue memory 505. The particular process 502 which launched the request that resulted in the receipt of the response then unloads the response from the identified queue for presentation to the caller which requested the particular information. TL read 406, TL write 407, request queue 403 and response queue 405 function in a similar manner.

An access node (service node) is also supported by other software processes (modules), such as processes 508 through 512. Monitor 510 (410), more particularly, is a maintenance program which periodically (e.g., every two seconds) records the current status (state) of each of the processes 502 (402) and presents the results to a system manager when requested to do so. In this way, the system manager may determine if a process is functioning properly or improperly and invoke an appropriate maintenance function if a process is shown to be functioning improperly.

As will be discussed below, scheduler 511 (411) is a software process that associates each of the processes 502 (402) with a particular set of instructions stored in memory 504 (404) and then activates the process. When a process 502 (402) is first activated it creates a log file in log file 512 (412) and thereafter stores errors that it encounters during the processing of a transaction in the file. Such errors are then processed further to determine the source of, or reason for, the error(s).

Speech files 508 contain segments of digitized text (words) associated with respective identifiers. In this way, a process 502 may call a particular subroutine to form a particular phrase by stringing together a group of respective identifiers and cause the phrase to be unloaded from speech files 508 and passed to an associated access module 15 (FIG. 2). The DSP contained in the associated access module 15, in turn, converts the digitized text into speech signals for transmission to the caller connected thereto. Speech files 408, on the other hand, contains a master copy of the digitized text that is stored in speech files 508. Unix system files 509 (409) contain the files which form the Unix operating system and which drive CPU 25 (80). The object manager 414 is a software module which processes stored data as an object and then outputs the data in a format called for by an associated transaction. For example, if a source of data uses a voice response arrangement to provide requested data, e.g., the balance in a particular bank account, and the transaction calls for the response to be delivered in the form of a facsimile, then object manager 414 transforms the received (stored) response into a facsimile for delivery to the requester via packet network 190.

Figure 5:
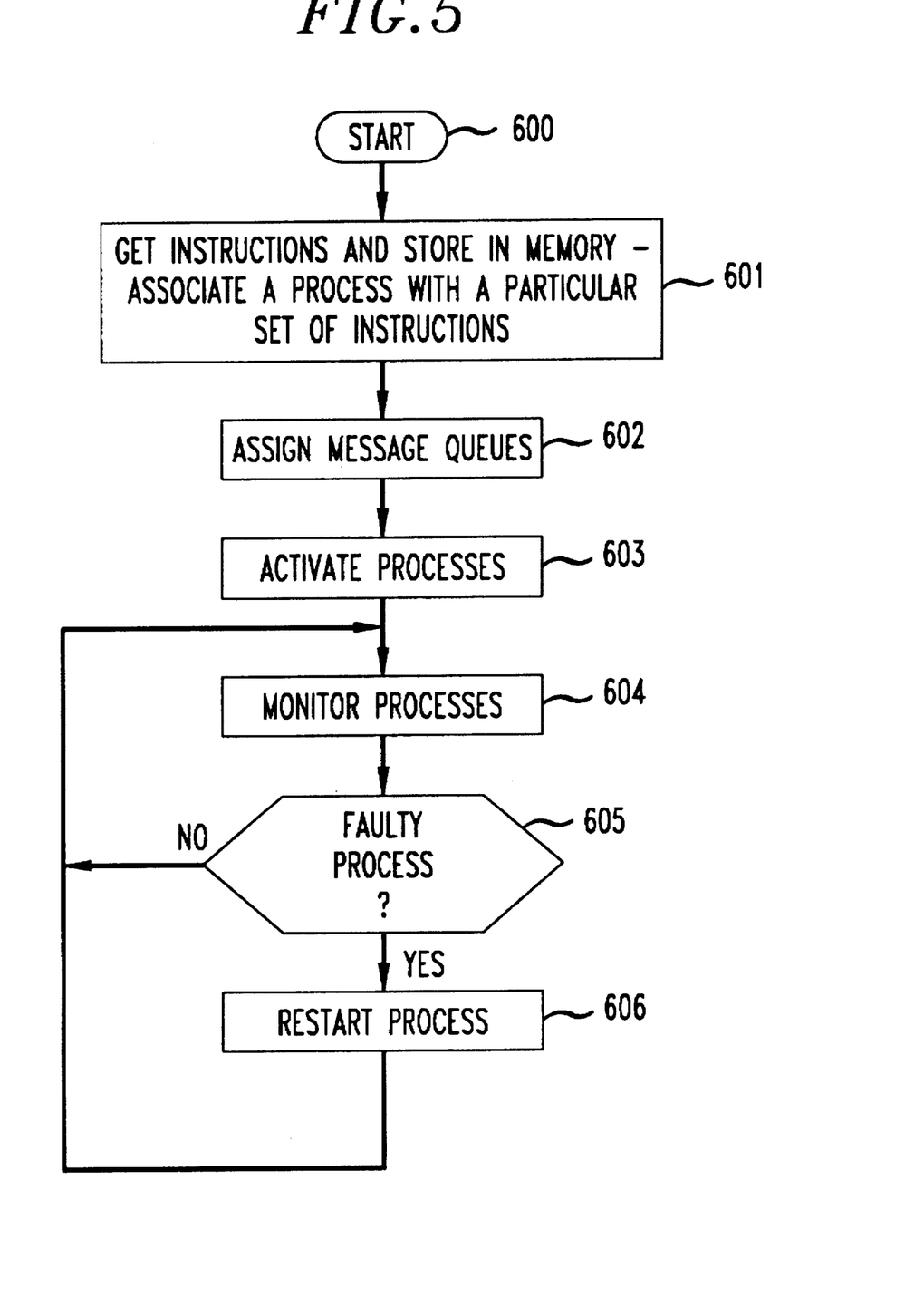
FIG. 5 illustrates in flow chart form the scheduler program of FIG. 4.

The scheduler program 511 (411) FIG. 5, more particularly, is entered at block 600 following the booting up of the associated UAN (service node), and then proceeds to block 601 where it unloads from disk memory (not shown) the sets of instructions that control the operation of individual ones of the processes 502 (402) and stores the sets in shared memory 504 (404). The program then determines from an associated table the number and types of processes that need to be created and then associates each of a like number of processes 502 with a particular set of instruction so that the process may emulate the interface that a particular information source, e.g., source 300-1, presents to a caller. The program then proceeds to block 602 where it creates message queues for each such process and then proceeds to block 603. At block 603, the program activates each such process and then proceeds to block 604 where it continually monitors the health of each activated process by checking to see if it received a so-called all-seems-well (asw) signal therefrom. That is, when a process is activated and it is functioning properly it periodically sends, e.g., once every ten minutes, via one of its assigned queues an asw indication to the scheduler program. If the scheduler program (block 605) does not receive an asw indication from an activated process then it restms (block 606) the process and outputs a message indicative thereof to a terminal associated with the network manager. The program then returns to block 604 to continue its monitoring function. (It is noted that the foregoing description of FIG. 5 also pertains to the operation of scheduler 411 with respect to processes 402 (FIG. 4).

Figure 6:
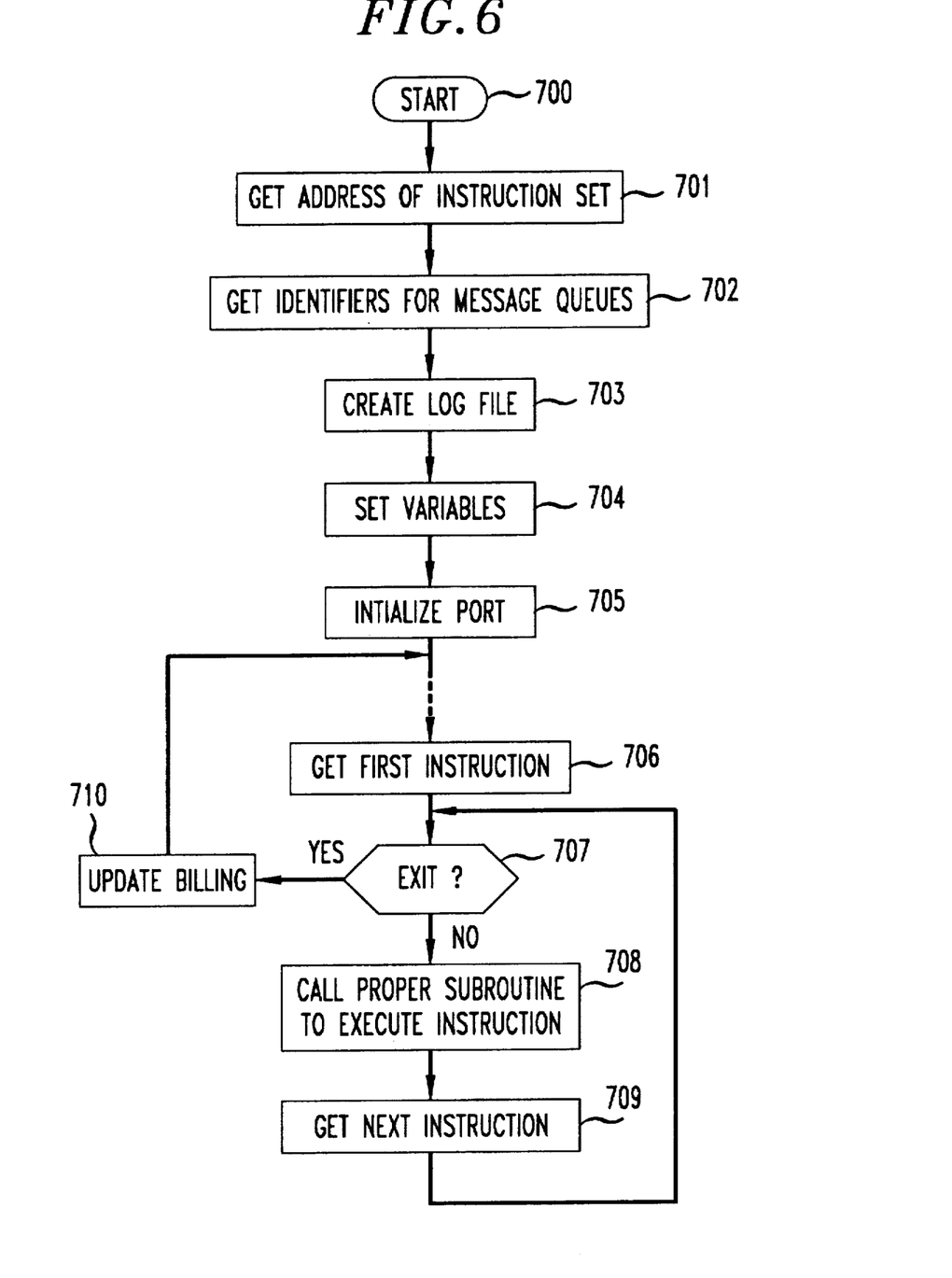
FIG. 6 illustrates in flow chart form the software processes of FIG. 4.

Turning now to FIG. 6, there is shown a flow diagram of a process 502 (402), which is entered at block 700 when activated by scheduler 511 (411 ). At block 700, the process proceeds to block 701 where it gets the memory 504 (404) address of its assigned instruction set and then proceeds to block 702 where it gets the identifiers for the message queues that it will use during a transaction. The program then proceeds to block 703 where it creates a log file in memory file 512 (412) and then proceeds to block 704 where it initializes various variables that it will use during the processing of a transaction (call). The process then initializes its assigned input port, e.g., ISDN PRI B channel, and then waits for receipt of a call via the assigned port. When such a call arrives, then the process proceeds to block 706 where it gets a copy of the first instruction of its assigned set of instructions and then proceeds to block 707 where it exits to block 710 if it finds that the instruction is a command indicating that the process has completed the processing of the transaction. If that is not the case, the process proceeds to block 708 where it passes control of the transaction to a subroutine designed to process the instruction, or command. When the subroutine (discussed below) has completed its task it then returns control of the transaction to the process at block 709. The process at block 709 then gets a copy of the next instruction in its set of assigned instructions and then proceeds to block 707 to process that instruction. At block 710, the program "cleans up" the processing of the transaction and then performs a billing function. That is, the process enters associated calling information in a call billing record. Such calling information includes, inter alia, the (a) calling party's telephone number, (b) called telephone number, (c) identity of the associated port that received the call, (d) duration of the call, (e) amount of time that it took to obtain information from the called source, and (f) type of transaction executed. The program then proceed to the output of block 706 where it waits for the receipt of a next call.

An illustrative example of possible script that may be executed by a UAN process to present a particular interface to a caller is listed in appendices A and B. The illustrative example assumes that a call is directed to a particular source of information, e.g., a bank, and that the caller desires to obtain information relating to the balance in an associated account. If the call is placed via a data terminal, e.g., terminal T1 of FIG. 1, then the illustrative script of appendix A may be executed by the process serving the B channel carrying the incoming data call to the associated UAN.

Referring then to appendix A, the process executing the script initially clears associated variables and then transmits for display on the terminal the term "Account Balance". The process then transmits the term "Account number" and then the term "PIN" (Personal Identification Number). The process then waits for INPut (input) from the caller, in which the input should be the caller's account number and PIN. The script/process then associates the transaction with an identifier, e.g., the value of twelve, and forms a message containing, inter alia, the entered account number and PIN. The process then "queues" the message for transmission to the information source via the packet network, as discussed above. The process then enters a "get IO" state to await the response from the information source. When the process receives that response via the associated response queue, it then transfers to one of two subroutines, GIVE_BAL or INVALID, based on the value of a so-called return code. If the return code is a one (1) then the caller's input was found to be valid and the process executes GIVE_BAL. If the return code is a two or a three, then the process executes INVALID. The GIVE_BAL subroutine transmits for display on the caller's data terminal the term "Your Account Balance Is" and then transmits the balance contained in the response message in terms of dollars and cents. The INVALID subroutine transmits for display the term "Invalid Information".

The script listed in appendix B is similar to that of Appendix A, but interacts with a caller verbally. That is, the DIS functions causes the various terms and account balance to be transmitted verbally.

The script listed in appendix C presents an interface which may be executed by a process at the service node upon receipt of the caller's inquiry. The script assumes that the information source is an IBM 3270 main frame. In particular, the script directs the associated process to wait for an initial display screen bearing a title of "banking". Responsive to receipt of the screen, the process executes a subroutine (GET_REC) designed to interface with the 3270 to obtain the caller's banking record. The GET_REC subroutine, more particularly, puts (PUT) the letter "G" and then the caller's account number contained in the associated message from the UAN into the 3270 screen that has been stored in associated memory. The subroutine then enters the ASCII code for the enter key and passes the screen to the 3270 I/O process. The process then waits (WAI) for the information source to return the caller's banking record. If a banking record is returned, then SUB_REC transfers to the SUCCESS subroutine. Otherwise, it transfers to the NOTFOUND subroutine. The SUCCESS subroutine sets a local return code to a one (1) and returns to the main process script. The NOTFOUND subroutine sets the local return code to a two (2) and then returns to the main process script. The main script then transfers to the GET_BAL or BAD_ACCT subroutine based on the local return code being a one or two, respectively.

The GET_BAL subroutine compares the value of the PIN contained in the received UAN message (S1) with the value of the PIN contained in the screen received from the information source (S2). If the PINs do not compare then the subroutine sets the return code that is returned to the UAN to a value of three and then returns to the main script. The main script (API) then causes a message containing the return code of three to be transmitted to the UAN via the packet network. The script then initializes the 3270 screen and then exits. If the PINs compare, then the subroutine sets the UAN return code to a one and then gets (GET) the account balance from the 3270 screen. The routine then returns to the main script (API) so that the latter return code and account balance may be sent to the UAN.

APPENDIX A

```
{001,SUB,,BAL
100,NOP ,bkbal.tty  12/10/92  07:00 pm
100,CLR
100,DIS,3,10,40,,L,"Account Balance"
100,DIS,6,10,40,,L,"Account Number:"
100,DIS,8,10,40,,L,"PIN:"
100,INP,6,48,10,M,N,,,Q
100,INP,8,48,4,M,N,,,Q
100,TRN,12
100,MSG,1,2
100,API
100,GETQ,I0
100,NOP,1 is ok & 2 is bad acct & 3 is bad pin
100,SUB,I0,GIVE_BAL,INVALID,INVALID
100,DIS,21,10,69,,,"Press Enter"
100,INP,21,22,2,,A,,,I
100,ESUB {001,SUB,,GIVE_BAL
100,DIS,17,10,40,,L,"Your Account Balance Is:"
100,DIS,17,39,10,$,,,
100,ESUB {001,SUB,,INVALID
100,DIS,17,10,40,,L,"Invalid Information"
100,ESUB
```

APPENDIX B

```
    {001,SUB,,BAL
    100,NOP,bkbal.phn  12/11/92 07:50 pm
    100,DIS,,,,,L,"3710",#10 Account Number
 5  100,INP,,,,M,N,,,Q
    100,DIS,,,,,L,"3703",#3 PIN
    100,INP,,,,M,N,,,Q
    100,TRN,12
    100,MSG,1,2
10  100,API,3706,3707
    100,GETQ,IO
    100,NOP,1 is ok and 2 is bad acct and 3 is bad pin
    100,SUB,IO,GIVE_BAL,INVALID,INVALID
    100,ESUB 15  {001,SUB,,GIVE_BAL
    100,GETQ,S1
    100,DIS,,,,,L,"3711",#11  Your Account Balance Is
    100,DIS,,,,$,V,S1
    100,ESUB 20  {001,SUB,,INVALID
    100,DIS,,,,,L,"3705",#5  Invalid Information
    100,ESUB
```

APPENDIX C

```
    001,NOP,bkbal.com 12/10/92 9:30 pm
    100,WAI,30,1,BANKING
    100,SUB,IO,GET_REC
 5  100,SUB,10,GET_BAL,BAD_ACCT
    100,API
    100,KEY,CLEAR
    100,PUT,,,4,L,"ISP7"
    100,KEY,ENTER
10  100,EXIT,, 001,SUB,,GET_REC
    100,PUT,05,19,01,L,"G"
    100,PUT,06,19,10,,
    100,KEY,ENTER
15  100,WAI,30,2,SUCCESS,NOT FOUND
    100,SUB,IO,SUCCESS,NOTFOUND
    100,ESUB 001,SUB,,GET_BAL
    100,GETQ,S1
20  100,GET,08,19,04,,V,S2
    150,IF,S1,!=,S2
    100,PUTQ,L,"3"
    100,GOTO,199
    100,FI,150
25  100,PUTQ,L,"1"
    100,GET,09,19,10,,Q
    199,ESUB

001,SUB,,SUCCESS
    100,SET,V,IO,1
30  100,ESUB

001,SUB,,NOTFOUND
    100, SET,V,IO,2
```

100,ESUB

001,SUB,,BAD_ACCT
100,PUTQ,L,"2"
100,ESUB

The foregoing is merely illustrative of the principles of the invention. Those skilled in the art will be able to devise numerous arrangements, which, although not explicitly shown or described herein, nevertheless embody those principles that are within the spirit and scope of the invention. For example, an idle process 502 may be assigned to an incoming call on "the fly" such that the process (a) is first initialized, (b) then associated with the set instructions designed to emulate the interface associated with a respective information source, and (c) then activated and assigned to handle the incoming call. When the sought-after information has been supplied to the caller and the caller terminates the call, then the process 502 is moved from a busy state to an idle state so that it may be assigned to handle a subsequent incoming call which may be directed to a different source of information. A process 402 may be arranged similarly.

We claim:

1. A method of processing a telephone call in a public switched telecommunications network comprising a plurality of network switches, said network switches being operative for establishing a telephone connection from an originating switch to a destination switch to route a telephone call to its intended destination, said method comprising the steps of responsive to receiving a first telephone call at said originating switch, routing said first telephone call to a first destination based on a first telephone number received with said first call, said first telephone number being associated with said first destination, responsive to receiving at said originating switch a second telephone call directed to a predetermined second destination and a second telephone number associated with said second destination, routing said second telephone call to an information services platform rather than to said second destination, said information services platform comprising a plurality of access nodes connected to said originating switch and at least one service node, said plurality of access nodes being disposed internal to said public switched telecommunications network and being connected to said at least one service node via an independent digital network, said at least one service node connecting directly to said second destination, receiving and answering said second telephone call at an idle one of said plurality of access nodes and presenting an interface associated with said second destination to a caller originating said second telephone call, responding to receipt of a request entered by said caller as a result of said presentation by sending said request to said at least one service node via said digital network for presentation to said second destination, said second destination being independent of said information services platform, and responsive to receipt of said request at said at least one service node, communicating said request to said second destination, receiving a response to said request from said second destination and sending said response to said one of said plurality of access nodes via said digital network.

2. The method set forth in claim 1 wherein said interface presented to said caller includes a plurality of menu items defining respective types of information supplied by said second destination.

3. The method set forth in claim 1 further comprising the steps of at said at least one service node, receiving said request from said digital network and presenting said request to said second destination, said request requesting particular information stored at said second destination, and receiving said particular information from said second destination and supplying said requested information to said one of said plurality of access nodes via said digital network for presentation to said caller.

4. The method set forth in claim 3 further comprising at said one of said plurality of access nodes the steps of receiving said requested information via said digital network, and presenting said requested information to said caller in a format expected by said caller.

5. The method set forth in claim 3 wherein said step of presenting said requested information to said caller includes supplying said requested information via a facsimile transmission.

6. The method set forth in claim 4 wherein said step of presenting includes presenting said information as data for display on a data terminal having a display.

7. The method set forth in claim 1 wherein said digital network is a data packet network.

8. A telecommunications system formed from a plurality of switches and operative for receiving a telephone call at an originating one of said plurality of switches and establishing a telephone connection from said originating switch to another one of said plurality of switches to route said call to an intended destination, said telecommunications system comprising means for receiving at said originating switch a telephone call directed to a source of information and for routing said telephone call to an information services platform associated with said originating switch, rather than routing said call to said source of information, wherein said information services platform comprising a plurality of access nodes associated with said originating switch and at least one service node associated with said source of information, said plurality of access nodes and said at least one service node being connected to one another via an independent digital network, said information services platform being disposed in said telecommunications system, and means, responsive to receipt of said telephone call for routing said telephone call to an idle one of said plurality of access nodes, and means, contained in said one of said plurality of access nodes and responsive to receipt of a request from an originator of said call requesting a particular information supplied by said source of information, for sending said request to said at least one service node via said digital network for presentation to said source of information.

9. The communications system set forth in claim 8 further comprising means, contained in said one of said plurality of access node and responsive to receipt of said requested information via said digital network, for supplying, said requested information to said originator via a telephone connection extending from said originator to said originating switch.

10. The communications system set forth in claim 8 further comprising in said at least one service node means for receiving said requested information from said source of information and sending said requested information over said digital network to said one of said plurality of access nodes for delivery to said originator.

11. The communications system set forth in claim 8 further comprising in said one of said plurality of access nodes means, responsive to receipt of said telephone call, for transmitting over a telephone connection extending from said originating switch to the originator of said telephone call an interface that said source of information presents to a caller connected directly to said source of information.

12. The communications system set forth in claim 8 further comprising in said at least one service node means, responsive to the receipt of said request via said digital network, for presenting said request to said source of information, and means, responsive to receipt of said requested information from said source of information, for sending said requested information via said digital network to said access node for delivery to said originator of said telephone call.

13. The communications system set forth in claim 11 wherein said means for transmitting said interface includes at least one programmable processor, and means for associating said programmable processor with said telephone call and for causing said programmable processor to execute a predetermined set of instructions defining said interface.

14. The communications system set forth in claim 13 wherein said predetermined set of instructions is one of a plurality of predetermined sets of instructions defining respective interfaces associated with different sources of information providing respective types of information, and wherein said programmable processor is associated with the telephone connection extending to the originator of said telephone call.

15. The communications system set forth in claim 14 wherein said programmable processor is associated with said predetermined set of instructions responsive to receipt of said telephone call and receipt of a called telephone number associated with said telephone call.

16. The communications system set forth in claim 8 wherein said digital network is a data packet network.

17. A method of processing a telephone call in a telecommunications network comprising a plurality of network switches, said network switches being operative for establishing a telephone connection from an originating switch to a destination switch to route a telephone call to its intended destination, said method comprising the steps of responsive to receiving at said originating switch a telephone call originated by a caller and associated with a called telephone number, routing said telephone call to one of a plurality of access nodes that is available to receive said telephone call if said called number is associated with a predetermined, independent source of information, otherwise routing said telephone call to its intended destination, at said one of said plurality of access nodes, communicating with said caller as though said caller were connected directly to said source of information and responsive to receipt of a particular request entered by said caller as a result of said communication forwarding said request via a digital network to a services node connected to said independent source of information, at said services node, presenting said request to said independent source of information, receiving a response from said independent source of information and forwarding said response via said digital network to said one of said plurality of access nodes for presentation to said caller via said originating switch.

18. A method of processing a telephone call in a telecommunications network comprising a plurality of network switches, said network switches being operative for establishing a telephone connection from an originating switch to a destination switch to route a telephone call to its intended destination, said method comprising the steps of responsive to receiving at said originating switch a telephone call originated by a caller and associated with a called telephone number, routing said call to an access node if said called number is associated with a predetermined, independent source of information, otherwise routing said call to its intended destination, at said access node, communicating with said caller as though said caller were connected directly to said independent source of information and, responsive to receipt of a particular request entered by said caller as a result of said communication, forwarding said request via a digital network to a services node connected to said independent source of information, at said services node, presenting said request to said independent source of information, receiving a response from said independent source of information and forwarding said response to said access node via said digital network for presentation to said caller via said originating switch, wherein said services node comprises a plurality of controllers each communicating with a respective one of a plurality of sources of information including said source of information, in which each of said sources of information is associated with a respective telephone number, said method further comprising the step of routing said request to the controller communicating with said source of information for presentation to said source of information.

\* \* \* \* \*